(12) United States Patent
Wang

(10) Patent No.: US 6,728,945 B1
(45) Date of Patent: Apr. 27, 2004

(54) BEHAVIORAL LEVEL OBSERVABILITY ANALYSIS AND ITS APPLICATIONS

(75) Inventor: Qi Wang, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 239 days.

(21) Appl. No.: 09/793,309

(22) Filed: Feb. 26, 2001

(51) Int. Cl.[7] .................................. G06F 17/50
(52) U.S. Cl. ..................... 716/18; 716/716; 716/17
(58) Field of Search ................... 716/1, 3–6, 7, 716/18

(56) References Cited

U.S. PATENT DOCUMENTS

| | | | | |
|---|---|---|---|---|
| 5,502,645 A | * | 3/1996 | Guerra et al. ............. | 716/18 |
| 5,774,370 A | * | 6/1998 | Giomi ....................... | 716/4 |
| 6,192,504 B1 | * | 2/2001 | Pfluger et al. ............. | 716/1 |

OTHER PUBLICATIONS

Qi Wang, Lei Wei "Graph–based iterative decoding algorithms for parity–concatenated trellis codes", IEEE translations on information theory, vol. 47, No. 3, Mar. 2001.*

Bryant, R.E. (1986) "Graph–Based Algorithms for Boolean Function Manipulation," *IEEE Transactions on Computers*, C–35(8):677–691.

van Eijndhoven, J., (1991) "The ASCIS Data Flow Graph: Semantics and Textual Format," *Technical Report EUT–Report 91–E–251* Eindhoven University of Technology, Eindhoven, Netherlands.

DeMicheli, (1994) "Synthesis and Optimization of Digital Circuits," McGraw Hill, Inc.

* cited by examiner

*Primary Examiner*—Vuthe Siek
*Assistant Examiner*—Naum Levin
(74) *Attorney, Agent, or Firm*—Reed Smith Crosby Heafey LLP

(57) ABSTRACT

A method and system are provided for computing behavioral level observabilities of a digital system. In one example, a logic network is provided for performing an observability analysis at the behavioral level of a digital system. The logic network includes logic objects configured to emulate behavioral observabilities computed from a control data flow graph (CDFG), wherein the logic objects include at least one of: first logic objects configured to compute a token observable condition (TOC) of an edge of the CDFG; and second logic objects configured to compute a node observable condition (NOC) of a node of the CDFG. A logic optimization is used to optimize the logic network to obtain an optimized logic network of the behavioral observabilities.

22 Claims, 8 Drawing Sheets

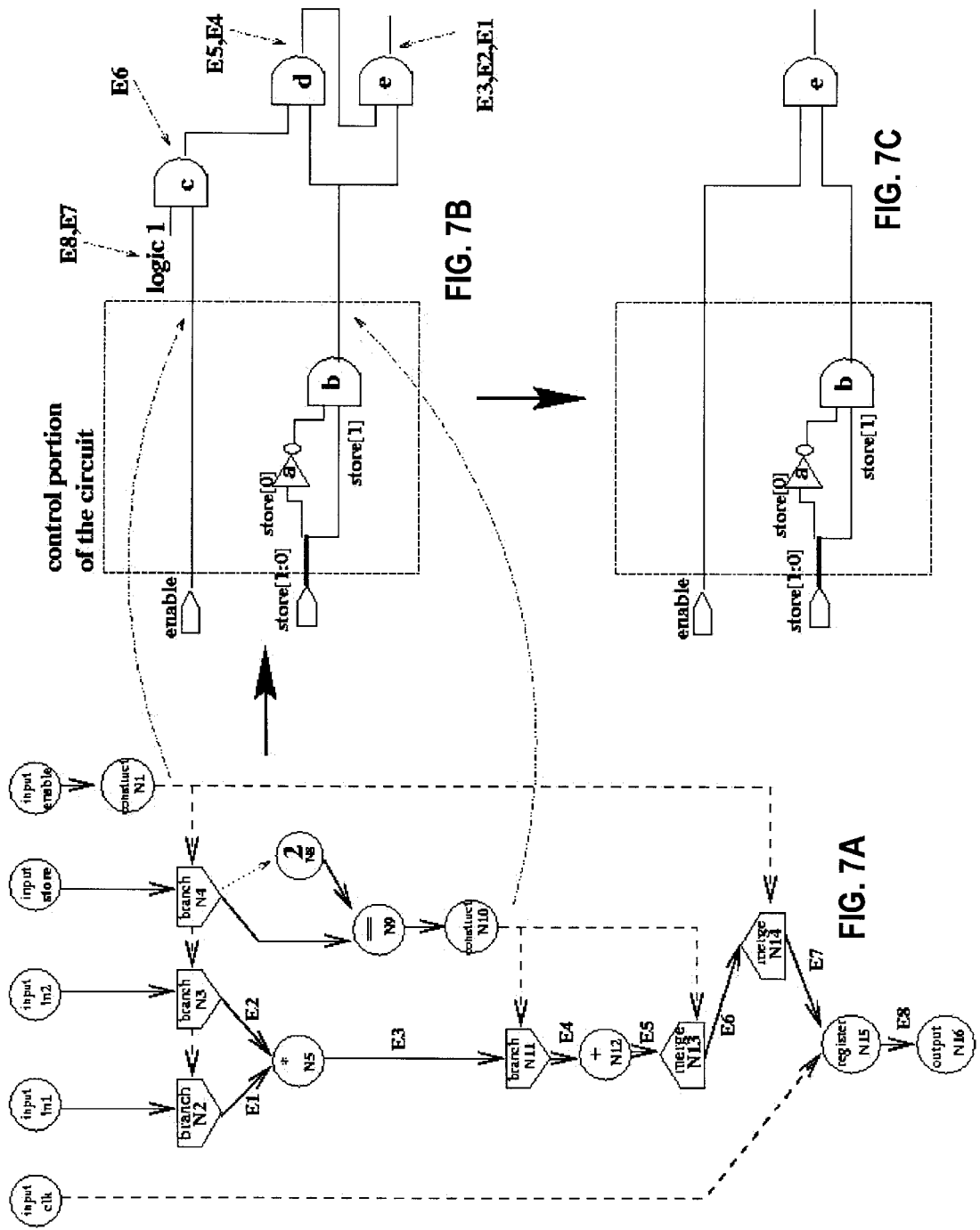

BEHAVIORAL LEVEL OBSERVABILITY ANALYSIS AND ITS APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates generally to digital system design and, more particularly, to techniques for analyzing behavior and optimizing performance of digital systems, such as integrated circuits.

2. Discussion of Background

Designing of digital hardware involves a multi-leveled synthesis process. At a higher level, the behavior of the digital hardware may be written in a hardware behavioral description language, such as Verilog or Very High Speed Integrated Circuit Hardware Description Language (VHDL). This description is parsed into a control data flow graph (CDFG). The CDFG is synthesized into a register transfer level (RTL) description. At the logic level, logic circuitry is synthesized from the RTL description. At a lower architecture level, physical layouts are synthesized from the logic circuitry.

Observability analysis in logic circuits has been widely used in logic synthesis, test generation, and many other Electronic Computer-Aided Design (ECAD) problems. For more information on observability analysis, see De Micheli, Giovanni, "Synthesis and Optimization of Digital Circuits," McGraw-Hill, Inc., 1994.

Observability analysis has traditionally been performed at the lower levels of the synthesis process. Unfortunately, performing an analysis, for example, at the logic level oftentimes makes it difficult to make necessary changes to the circuit design. The logic level relates to the generation of performance-optimal circuit representations from models in hardware description languages.

A general rule of thumb is that the lower the level, the more difficult it is to make changes to the digital system design. For example, in a synthesis process, architectural level decisions include the following: determining which type of multiplier to be used; determining whether the calculation is to be implemented serially or in parallel. These early stage decisions will have a more significant impact on the final implementation of a design. Then after the architectural level decisions are made, the design is then mapped to a network of logic gates. At the logic level, the freedom of design is substantially less than that at the architectural level. Thus, changes made at the lower levels, such as the logic level, are increasingly time-consuming and costly.

SUMMARY OF THE INVENTION

It has been recognized that what is needed is a technique for analyzing observabilities of digital systems at a higher level of the synthesis process. Broadly speaking, the present invention fills these needs by providing a method and system for computing behavioral level observabilities of an digital system. It should be appreciated that the present invention can be implemented in numerous ways, including as a process, an apparatus, a system, a device, or a method. Several inventive embodiments of the present invention are described below.

In one embodiment, a method is provided for performing an observability analysis at the behavioral level of a digital system. The method comprises computing a token observable condition of an edge of a control data flow graph (CDFG); and computing a node observable condition of a node of the CDFG. Each step of computing comprises: traversing the control data flow graph from output nodes to input nodes; and applying appropriate Boolean algebra operations to the traversed CDFG.

In another embodiment, a logic network is provided for performing an observability analysis at the behavioral level of a digital system. The logic network comprises logic objects configured to emulate behavioral observabilities computed from a control data flow graph (CDFG), wherein the logic objects include at least one of: first logic objects configured to compute a token observable condition (TOC) of an edge of the CDFG; and second logic objects configured to compute a node observable condition (NOC) of a node of the CDFG. A logic optimization is used to optimize the logic network to obtain an optimized logic network of the behavioral observabilities.

Advantageously, in synthesis of digital systems such as integrated circuits, the more important decisions are made at the behavioral level. Moreover, it has been found that much of the information easily available at the behavioral level may become very difficult to retrieve at lower levels. Thus, the proposed behavioral level observability analysis provides valuable information for optimization in later design cycles.

The value of the present invention is exemplified and demonstrated by two applications, one is for power optimization and the other is for behavioral level redundancy removal. Also provided is an efficient, practical approach to computing the token observable conditions (TOC's) and node observable conditions (NOC's).

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 7A is the CDFG of a simple digital system, in accordance with one embodiment of the present invention.

FIG. 7B shows a logic network generated from the CDFG of FIG. 7A, in accordance with one embodiment of the present invention.

FIG. 7C shows the token observable conditions of selected edges after applying simple logic optimizations, in accordance with one embodiment of the present invention.

DESCRIPTION OF THE PREFERRED EMBODIMENTS

An invention for a method and system for performing an observability analysis at the behavioral level of a digital system is disclosed. Numerous specific details are set forth in order to provide a thorough understanding of the present invention. It will be understood, however, to one skilled in the art, that the present invention may be practiced without some or all of these specific details.

Overview of Control Data Flow Graph

For behavioral level observability analysis, a Control Data Flow Graph (CDFG) is used to provide a graphical representation of the behavioral level description of a digital system. A CDFG is a graphical representation of the behaviors of digital hardware. The graph is generated from hardware behavioral description languages, such as Verilog or Very High Speed Integrated Circuit Hardware Description Language (VHDL), and serves as an interface to different register transfer level (RTL) and architectural synthesis and formal verification packages.

A CDFG consists of nodes and directed edges. The nodes represent operations in the behavioral specification such as Verilog or VHDL. The edges model the transfer of values between the nodes. In other words, the result of one operation (node) is passed to the argument of another one. Every argument of an operation can be seen as an input port of the corresponding node of the CDFG. Every result of an operation can be seen as an output port of the corresponding node of the CDFG. A token is defined as a single data value instance. There are six main types of nodes.

Figure 1:
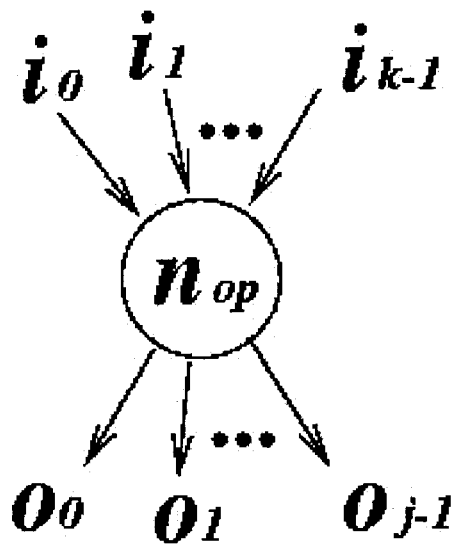
FIG. 1 is a graphical representation of an operation node of a control data flow graph (CDFG) of a digital system, in accordance with one embodiment of the present invention.

FIG. 1 is a graphical representation of an operation node $n_{op}$ of a CDFG, in accordance with one embodiment of the present invention. Operations can be arithmetic, like +, −, ×, =, or Boolean, like ∧, ∨ or can be more complex functions or an instantiation of another graph, which models the procedures and functions in the behavioral specification. FIG. 1 shows operation node $n_{op}$ with input edges $i_0$ to $i_{k-1}$ and output edges $o_0$ to $o_{j-1}$. The node performs the operation defined by $n_{op}$ on the data values of the input edges and transfer the result to all output edges.

Every CDFG requires at least one input node and one output node. Input nodes are the only nodes without input ports and have one output port. Output nodes are the only nodes without output ports and have one input port.

Nodes of type constant are nodes, which generate a constant data value at their single output port.

Figure 2:
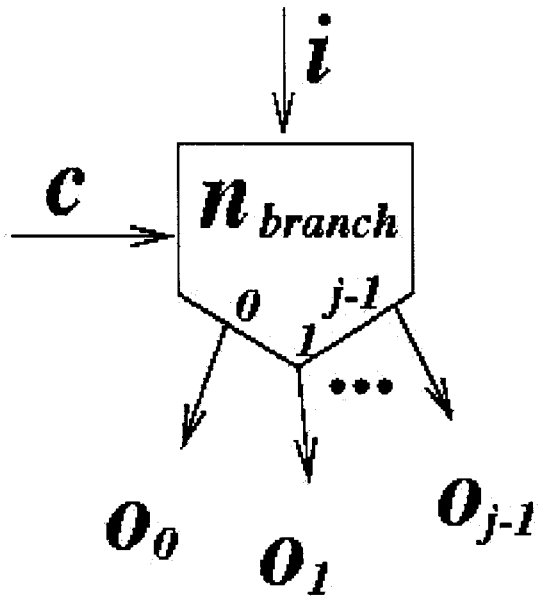
FIG. 2 is a graphical representation of a branch node of a CDFG, in accordance with one embodiment of the present invention.

FIG. 2 is a graphical representation of a branch node $n_{branch}$, in accordance with one embodiment of the present invention. A branch node has two input ports, a control port and a data port, and at least one output port. Based on the value of token on the control port, one and only one output port is selected and the token on the data port is passed to the selected output port. The branch node $n_{branch}$ is shown with input data edge i and input control edge c and output edge $o_0$ to $o_{j-1}$.

For example, if the data value on the control edge c is 0, then the data value on the input edge i is transferred to the output edge $o_0$.

Figure 3:
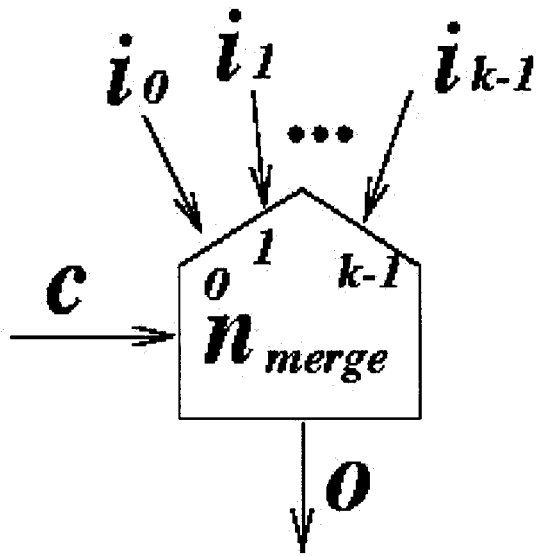
FIG. 3 is a graphical representation of a merge node of a CDFG, in accordance with one embodiment of the present invention.

FIG. 3 is graphical representation of a merge node $n_{merge}$, in accordance with one embodiment of the present invention. Merge nodes are dual to branch nodes. A merge node has one output port, one input control port and several input data ports. The merge node $n_{merge}$ passes the token on one input data port, selected by the value of the token on the control port, to the output port. The merge node $n_{merge}$ is shown with input data edges $i_0$ to $i_{k-1}$, and input control edge c and output edge o. For example, if the data value on the control edge c is 0, then the data value on the input edge $i_0$ is transferred to the output edge o.

Figure 4:
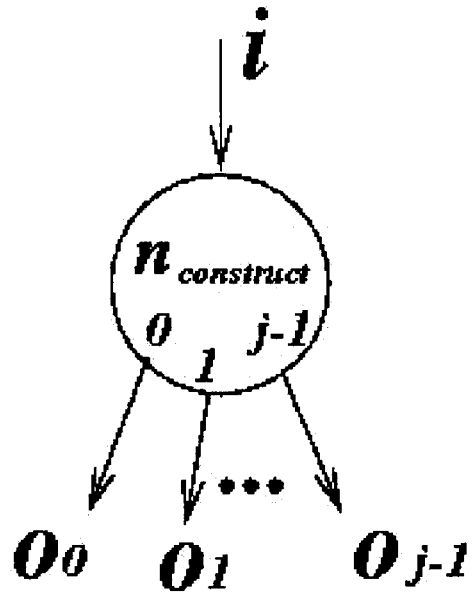
FIG. 4 is a graphical representation of a construct node of a CDFG, in accordance with one embodiment of the present invention.

FIG. 4 is a graphical representation of a construct node $n_{construct}$, in accordance with one embodiment of the present invention. These are special nodes, which only serve the purpose to generate tokens to control the branch and merge nodes. It has one input data port and at least one output control ports. Only one output port is selected to pass the token from the input port according to the value of the token.

Figure 5:
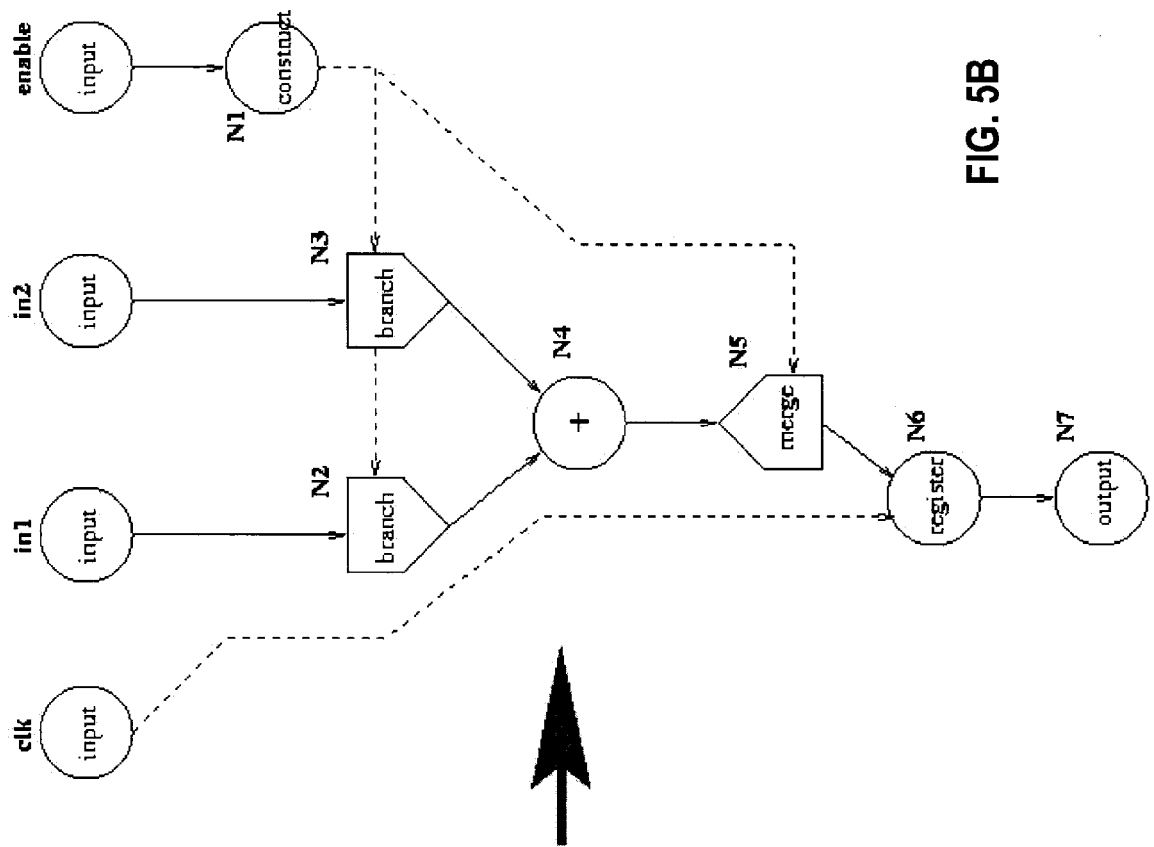
FIG. 5A is a simple Verilog description of a digital system, in accordance with one embodiment of the present invention.
FIG. 5B is the corresponding CDFG to FIG. 5A, in accordance with one embodiment of the present invention.

FIG. 5A and FIG. 5B show a simple Verilog description of a digital system and the corresponding CDFG, respectively, in accordance with one embodiment of the present invention. Note that there are two types of edges in the graph. The edges represented by the solid lines are the data edges and those represented by the dash lines are the control edges. The discrimination of edges is only for drawing and synthesis purposes and has no influences on its behavior. More details about CDFG can be found in J. van Eijndhoven, G. de Jong, and L. Stok, "The ASCIS data flow graph: semantics and textual format," Technical Report EUT-Report 91-E-251, Eindhoven University of Technology, Eindhoven, Netherlands, June 1991.

Digital Hardware Design

Figure 6:
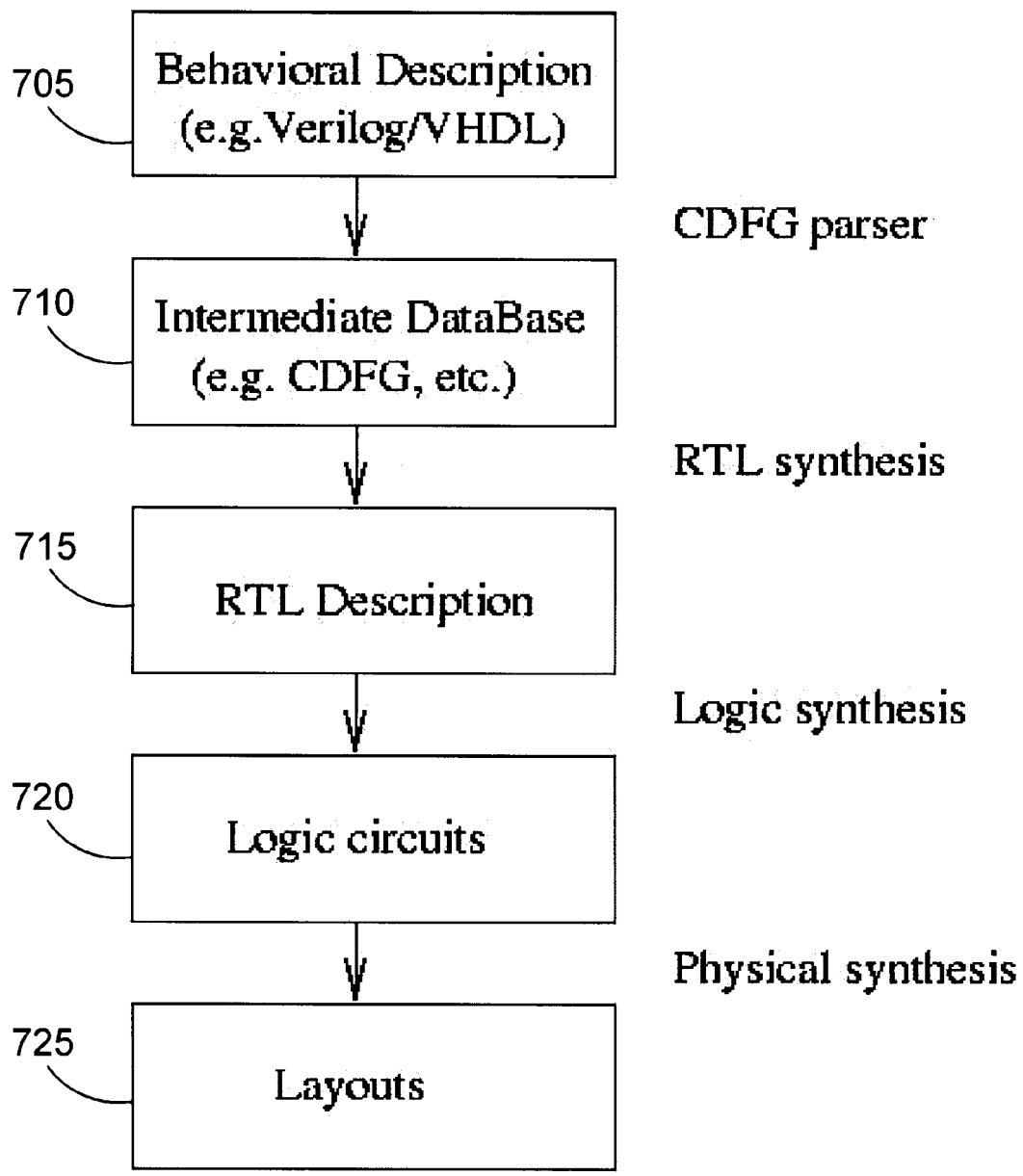
FIG. 6 is a flowchart to illustrate the normal flow involved in the design of a digital system, in accordance with one embodiment of the present invention.

FIG. 6 is a flowchart to illustrate the normal flow involved in the design of a digital system, in accordance with one embodiment of the present invention. FIG. 6 is provided for examplary purposes to illustrate the role of CDFG in designing digital hardware. The flowchart starts in step 705 with the behavioral description of a design such as Verilog/VHDL specification.

In step 710, the behavioral synthesis generates an intermediate database, such as a CDFG, that serves as the input to the RTL synthesis. The output of the RTL synthesis is an RTL description (or netlist of the design) in step 715. Logic synthesis then translates an RTL netlist to a logic level netlist and optimizes the circuits in step 720. The physical design eventually generates, in step 725, the geometric layout of the design on the silicon.

Note that the design space explored at behavioral level and RTL is much larger than that at the logic and the physical level. Much of the information available at a high-level may not be available at lower levels. Thus, the present invention provides a technique for optimization to be performed at a higher level in the design process.

Behavioral level Observability Analysis

The proposed high-level observability analysis is based on the CDFG representation of a digital design. A token in a CDFG is the counterpart of a signal in a logic circuit. Signal observability analysis has been well studied in the context of logic circuits. Thus, in the following discusion, we refer to the high-level observability analysis as the token observability analysis on CDFG.

A token observable condition (TOC) of an edge $e_{ij}$, denoted by $TOC(e_{ij})$, is the condition under which the token on that edge can be observed at one or more output nodes of a CDFG. A node observable condition (NOC) of a node $n_i$, denoted by $NOC(n_i)$, is the condition under which the token on any output edge of the node can be observed at one or more output nodes of a CDFG. The NOC of an output node is 1. A token observability of an edge $e_{ij}$, denoted by $TO(e_{ij})$, is the probability of $TOC(e_{ij})$ being 1. A node observability of a node $n_i$, denoted by $NO(n_i)$, is the probability of $NOC(n_i)$ being 1.

Given a CDFG, the TOC and NOC for all edges and nodes can be computed by traversing the graph from the output nodes to the input nodes and applying appropriate Boolean operations. Let ^, , and ' denote the Boolean AND, OR, and inversion operations respectively. For each different type of node, the TOCs of all edges and NOCs of all nodes are computed as follows:

1) Output nodes: By definition, for an output node $n_{out}$ with input edge i,

NOC $(n_{out})$=1; and $TOC(i)$=1.

2) Operation nodes: For an operation node $n_{op}$ such as the one in FIG. 1 with input edges of $i_0, \ldots, i_{k-1}$, and output edges of $o_0, \ldots, o_{j-1}$, we have NOC $(n_{op})$=TOC $(o_0)$TOC $(o_1) \ldots$ TOC $(o_{j-1})$; and $TOC(i_p)$=NOC$(n_{op})$, $\forall p \in \{0, 1, \ldots, k-1\}$.

3) Branch nodes: For a branch node $n_{branch}$ as shown in FIG. 2, with input data edge of i and input control edge of c and output edges of $o_0, \ldots, o_{j-1}$, we have NOC $(n_{branch})$=TOC $(o_0)$ TOC $(o_1) \ldots$ TOC $(o_{j-1})$;

$TOC(c)$=NOC $(n_{branch})$; and

TOC (i)=$(c_0$ ^ TOC $(o_0))$ $(c_1$ ^ TOC$(o_1)) \ldots$ a $(c_{j-1}$ ^ TOC $(o_{j-1}))$, where $c_p$, $\forall p \in [0,j-1]$ is a Boolean encoding of the variables for the value of the token at the control port to select output port p. For example, if the token on c is two bit wide (c=$c_1c_0$) and output port 2 is selected, i.e. c is (10) in binary, then the condition to select a port is $C_1$^$c_0$'.

4) Merge nodes: For a merge node $n_{merge}$ as shown in FIG. 3, with input data edges of $i_0, \ldots, i_{k-1}$ and input control edge of c and output edge of o, we have NOC $(n_{merge})$=TOC $(o)$;

$TOC(c)$=$TOC(o)$; and $TOC(i_p)$=$c_p$^$TOC(o)$, $\forall p \in [0, k-1]$, where the definition of $c_p$ is the dual to that described for branch nodes, in other words, the condition under which the input port p is selected by $n_{merge}$ to pass the token to the output port.

5) Input nodes and construct nodes: For the sake of TOC/NOC analysis, input and construct nodes are the same as operation nodes.

Computation of Behavioral level Observabilities

Computing token observable conditions (TOC's) and node observable conditions (NOC's) requires Boolean operations. An efficient and yet simple approach to compute TOC/NOC of a CDFG is provided.

An important aspect of the approach is the separation of traversing CDFG from computing TOC/NOC. A well known binary decision diagram (BDD) is not built for the TOC/NOC of each edge and node. Instead, a logic network is constructed whenever a Boolean operation is required to compute the TOC/NOC. The logic network is then optimized using logic optimization techniques such as algebraic transformations, to obtain the optimized Boolean function of the TOC/NOC. The transformations used in the optimization process are chosen to be simple enough so that computing TOC/NOC will be almost invisible to the overall optimization flow. This method is ideal for the front-end RTL synthesis tool where a CDFG is translated into a gate level netlist and there exists a one-to-one correspondence between the objects of a CDFG and the objects of the logic network. The method is best explained by an example.

FIG. 7A is the CDFG of a simple digital system, in accordance with one embodiment of the present invention.

FIG. 7B shows a logic network generated from the CDFG of FIG. 7A, in accordance with one embodiment of the present invention. The control portion of the logic network is illustrated inside a dotted box. The rest of the circuit is omitted for simplicity. As stated above, there is a one-to-one correspondence between the objects of the CDFG and the objects of the generated logic network. For example, the Boolean functions at the output of AND gate b and the input port enable in FIG. 7B correspond to the variables at the output port of the construct node N10 and N1, respectively.

For exemplary purposes, the computation of TOC will be explained for edges E1 and E2 of FIG. 7A. The computation starts from the output nodes using the equations described above. It is easy to see the TOC of edges E8 and E7 is simply logic 1, as highlighted in FIG. 7B. For edge E6, the TOC is the Boolean AND of the TOC of E7 and the variable of the control port of the node N14 which is the same as the variable at the output port of construct node N1. Consequently, in FIG. 7B the AND gate c is constructed such that the output represents the TOC of E6. Similarly, the TOC of edge E5 is the AND of TOC of edge E6 and the variable of the control port of node N13. The AND gate d is created for the TOC of edge E5. The process continues until the edges E1 and E2 are reached. As shown in FIG. 7B, the output of the AND gate e represents the TOC of edges E2 and E1.

FIG. 7C represents the TOC of edges E1, E2, and E3 after applying simple logic optimizations, in accordance with one embodiment of the present invention. Note that only a single traversal was required to compute the TOCs of these edges.

It should be noted that an alternative way of performing Boolean operations is to use a binary decision diagram (BDD). For more information on BDD's, see R. Bryant, "Graph-Based Algorithms For Boolean Function Manipulation," IEEE Transactions on Computers, C-35(8): 677–691, August 1986.

However, if large Boolean functions are involved, the BDD approach may not be as efficient as the logic network approach described above with reference to FIG. 7B. For example, the size of the BDD of a multiplication function is exponential to the number of inputs of the function. This size problem will not only slow down operations, but will also make it impossible to construct a global BDD in practice to represent a single Boolean function in the worst case. This kind of unpredictable performance is not suitable at the high level analysis and synthesis where run time is crucial and optimization decisions have to be made quickly.

Another problem of using the BDD method for this particular problem is that constructing BDDs directly on the CDFG is difficult where only behavioral description of a node is available. For example, if a control token comes out from the result of an adder, then the BDDs of all the outputs of the adder should be built first before the BDD of the control signal can be constructed. Even though each output of the adder can be represented by a Boolean function, the addition itself is an arithmetic operation. Even if doable, constructing BDDs for an arithmetic operation is likely to be expensive and time-consuming.

Application of the Invention

The result of token observability analysis can be used later for RTL or even gate-level optimization. In the first example below, we show its application in power optimization. In the second example, we show its application in behavioral level redundancy removal.

Application in Power Optimization

Figure 8B:
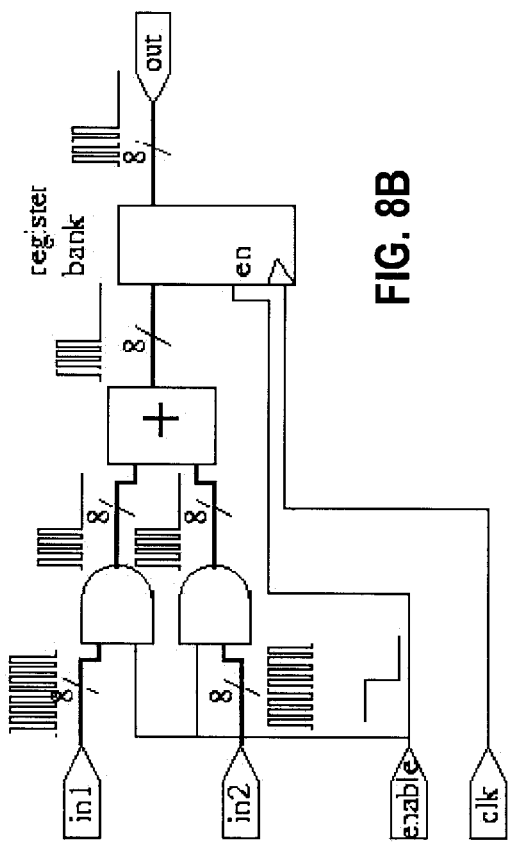
FIG. 8B shows transformations that can be applied without changing the functionality of the digital hardware, in accordance with one embodiment of the present invention.
Figure 8A:
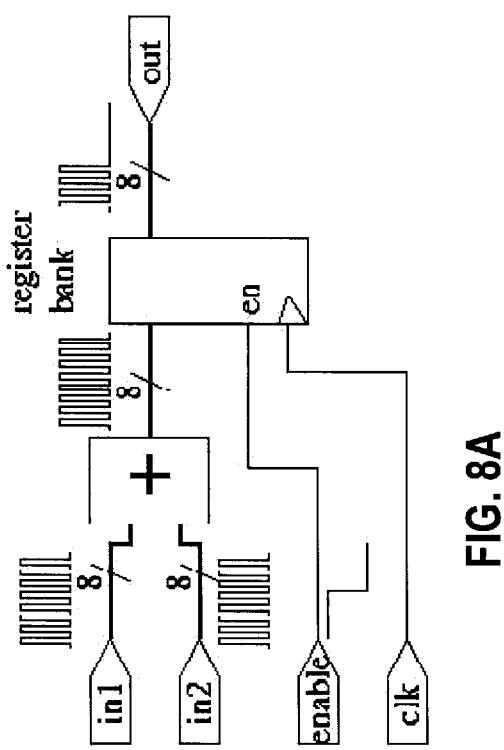
FIG. 8A shows a register transfer level (RTL) netlist of a digital system described by the CDFG of FIG. 5B, in accordance with one embodiment of the present invention.

FIG. 8A shows an RTL netlist of a digital system described by the CDFG of FIG. 5B, in accordance with one embodiment of the present invention. Along with the connections, the signal switching activity is also symbolically shown in FIG. 8A. Although the 8-bit adder computes data from input ports in1 and in2 all the time, its results are used (latched) from the output registers for only half of the time, as can be seen by the switching activity at the input port enable and the outputs of the register file. Since the results of the adder are not used for 50% of the time, most of the power dissipated by the adder is wasted.

Using the TOC analysis described above, we know that the TOC's of the edge E1 and E2 in FIG. 5B are simply enable. The edge E1 and E2 correspond to the signals connected to in1 and in2 of FIG. 8A, respectively. Note that the data on these signals are only observable when enable is high (logic 1).

FIG. 8B shows transformations that can be applied without changing the functionality of the design of the digital system, in accordance with one embodiment of the present invention. For simplicity, a single AND gate to represent a vector of 8 AND gates is used. After the transformation, the switching activity at the input of the adder is reduced significantly as the probability of enable being high is much less than 1. As a result, the power dissipated by the adder as well as those dissipated by the register file is also reduced significantly.

The transformation shown in FIG. 8B can be easily identified from the Verilog description without the help of the TOC/NOC analysis. However, for real industry designs with very complicated control flow and thousands of lines of Verilog codes, the proposed TOC/NOC analysis provides a systematic and clean way to find out these potential power reduction transformations.

Application in Behavioral Redundancy Removal

Figures 9A, 9B:
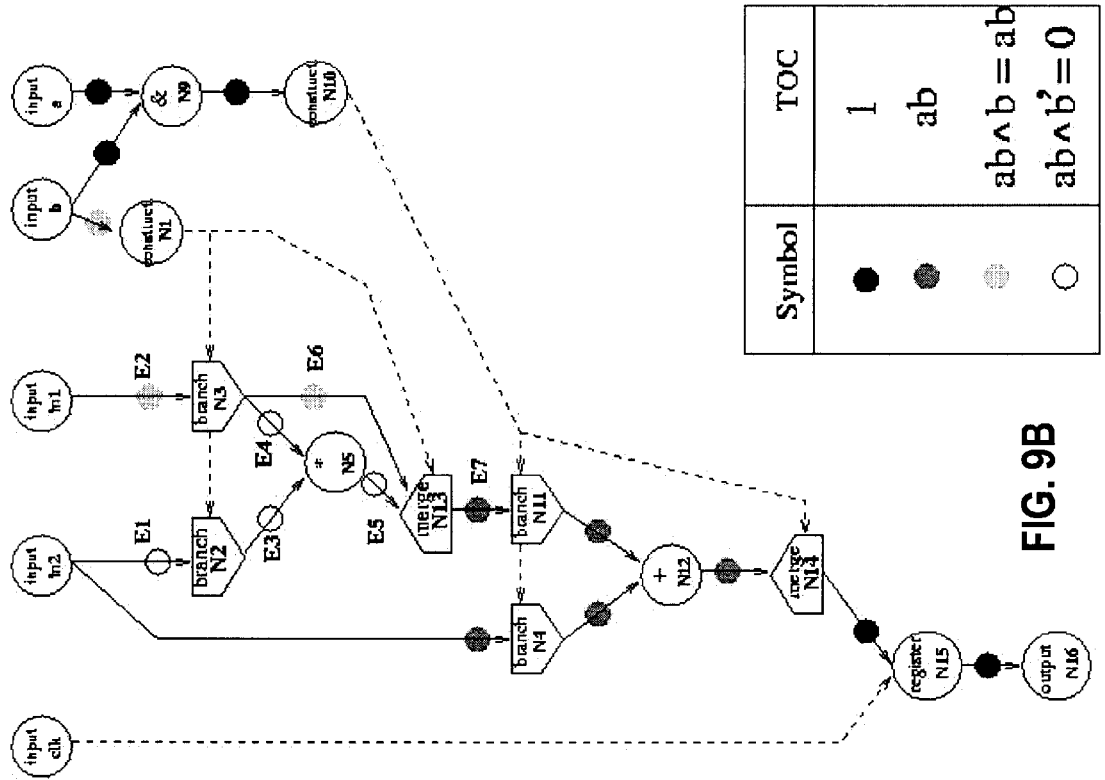
FIG. 9A is a Verilog description of a digital system, in accordance with one embodiment of the present invention.
FIG. 9B is the corresponding CDFG to FIG. 9A, in accordance with one embodiment of the present invention.

FIG. 9A and FIG. 9B show a Verilog description of a digital design and its corresponding CDFG, respectively, in accordance with one embodiment of the present invention. From the Verilog description, we know that the control signal that comes out from construct node N10 is simply ab, which controls nodes N4, N11 and N14. The control signals that come out from construct node N1 are b and b', which control nodes N2, N3 and N13. Based on this information, the TOC/NOC analysis can be carried out from the output node to the input nodes. The result of the TOCs of all data edges of the CDFG is pictorially annotated in FIG. 9B. As an example of computation, consider the edge E5 and E6. Note that we know TOC(E7)=ab, and the control signal to the port of E5 connected to is b'. Therefore, using formulas provided above, TOC (E5)=ab^b'=0. Since the control signal to the port of E6 connected to is b, then TOC(E6)=ab^b=ab.

As shown in FIG. 9B, the TOC's of edges E1, E3, E4, and E5 are all zero (0), which means the data on these edges are not observable at the output node. These are redundant edges and nodes and can be removed without changing the functionality of the design.

Figure 9C:
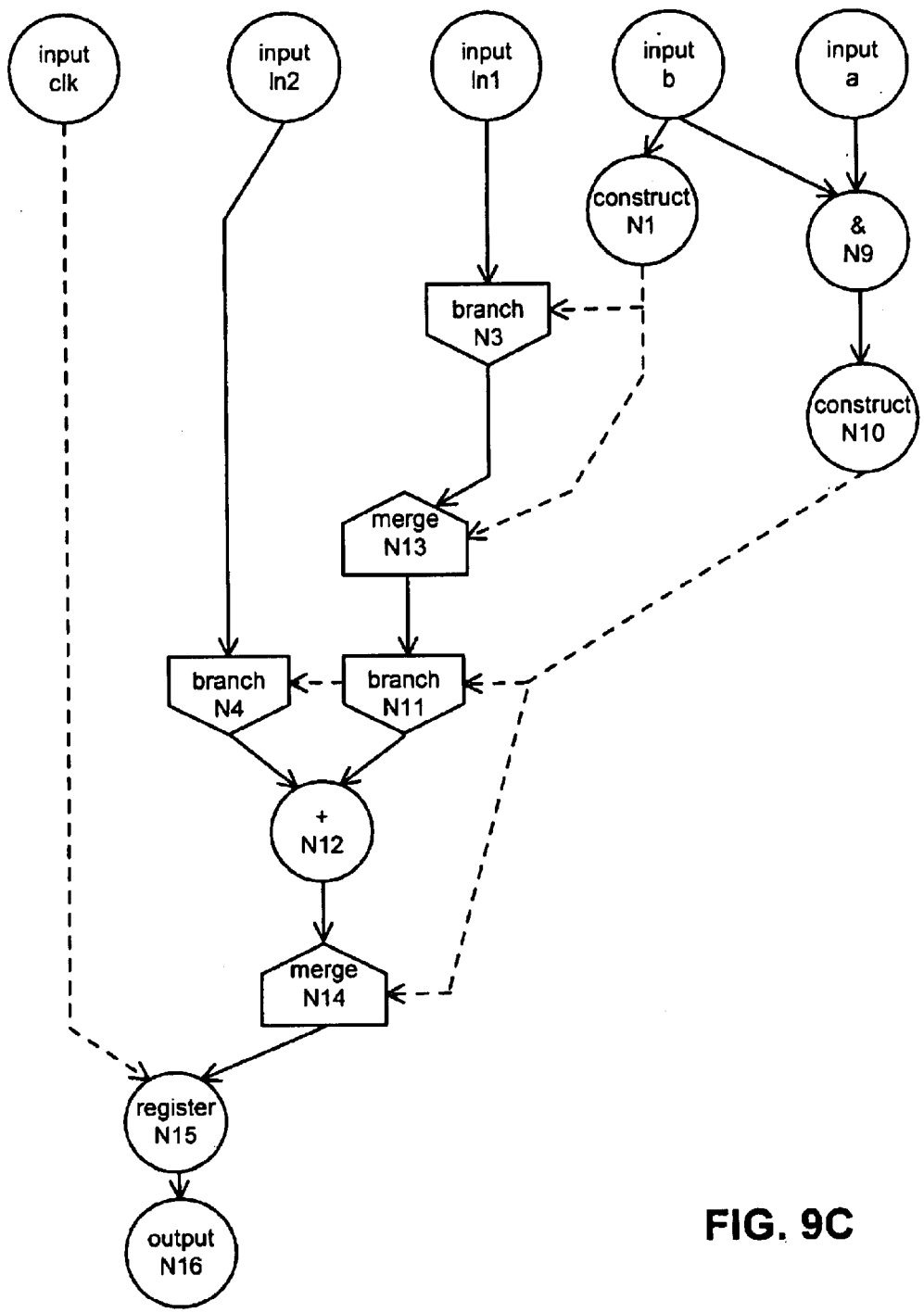
FIG. 9C is an optimization of the CDFG of FIG. 9A after removing the redundant edges along with the dangling nodes, in accordance with one embodiment of the present invention.

FIG. 9C is an optimization of the CDFG of FIG. 9B after removing the redundant edges along with the dangling nodes, in accordance with one embodiment of the present invention.

This design may be synthesized using the Cadence Envisia Synthesis™ tool, the most advanced synthesis tool in the market. However, the redundancy is not caught by either the front-end (behavioral +RTL) or backend (logic) synthesis. As a result, the final synthesized circuit has a multiplier in it which not only contributes a lot of area in the final implementation but also leads to incorrect prediction of the performance of the design because the static time analyzer easily finds out the multiplier is on the critical path. On the other hand, if TOC/NOC analysis is applied and the results are used to simplify the CDFG by removing unobservable node and edges during the front-end synthesis, a better synthesized netlist is obtained in terms of both area and performance within less CPU time. The speedup in CPU time is due to the fact that the CDFG is simpler and has less operation nodes and data edges.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits (ASIC's) or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, computing token observable conditions, and computing node observable conditions, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing an observability analysis at the behavioral level of a digital system, the method comprising:
   computing a token observable condition of an edge of a control data flow graph (CDFG), wherein the token observable condition is used to identify a redundant edge of the control data flow graph (CDFG); and
   computing a node observable condition of a node of the CDFG, wherein the node observable condition is used to identify a redundant node of the control data flow graph (CDFG).

2. The method of claim 1, wherein each step of computing comprises:
   traversing the control data flow graph from output nodes to input nodes; and
   applying appropriate Boolean algebra operations to the traversed control data flow graph (CDFG).

3. The method of claim 1, wherein the node is an output node having a single input port, and wherein the edge is connected to the single input port of the node, and wherein the token observable condition for the edge is 1, and wherein the node observable condition for the output node is 1.

4. The method of claim 1, wherein the node is an operation node having at least one input port and at least one output port.

5. The method of claim 1, further comprising computing an observability of the node of the control data flow graph, wherein the node is a branch node having an input control port and an input data port and at least one output data port.

6. The method of claim 1, further comprising computing an observability of the node of the control data flow graph, wherein the node is a merge node having an input control port and an output data port and at least one input data port.

7. The method of claim 4, wherein a construct node is the same as an operation node.

8. A method of computing behavioral level observabilities of a digital system, the method comprising:
   constructing a logic network based on a control data flow graph (CDFG) of the digital system, wherein the logic network is constructed to compute the behavioral level observabilities;
   optimizing the logic network using a logic optimization technique to obtain an optimized Boolean function of the behavioral level observabilities; and
   traversing the optimized Boolean function to obtain the behavioral level observabilities, wherein the behavior-level observabilities are used to identify redundant edges and redundant nodes of the control data flow graph (CDFG).

9. The method of claim 8, wherein the logic optimization technique includes algebraic transformations.

10. The method of claim 8, wherein the behavioral level observabilities are used in conjunction with a front-end register transfer level (RTL) synthesis tool.

11. The method of claim 10, wherein the behavioral level observabilities are used to optimize the digital system at the gate-level.

12. The method of claim 8, wherein the behavioral level observabilities are used to design the digital system to be more efficient with the use of power.

13. The method of claim 8, further comprising removing redundant edges and redundant nodes from the control data flow graph (CDFG) without changing the functionality of the CDFG.

14. A computer-readable medium carrying one or more sequences of one or more instructions for performing an observability analysis at the behavioral level of a digital system, the one or more sequences of one or more instructions including instructions which, when executed by one or more processors, cause the one or more processors to perform the steps of:
   computing a token observable condition of an edge of a control data flow graph (CDFG), wherein the token observable condition is used to identify a redundant edge of the control data flow graph (CDFG); and
   computing a node observable condition of a node of the CDFG, wherein the node observable condition is used to identify a redundant node of the control data flow graph (CDFG).

15. The computer-readable medium as recited in claim 14, wherein each step of computing further causes the processor to carry out the steps of:
   traversing the control data flow graph from output nodes to input nodes; and
   applying appropriate Boolean algebra operations to the traversed control data flow graph (CDFG).

16. The computer-readable medium as recited in claim 14, wherein the node is an output node having a single input port, and wherein the edge is connected to the single input port of the node, and wherein the token observable condition for the edge is 1, and wherein the node observable condition for the output node is 1.

17. The computer-readable medium as recited in claim 14, wherein the node is an operation node having at least one input port and at least one output port.

18. The computer-readable medium as recited in claim 14, wherein the instructions further cause the processor to carry out the step of computing an input control edge of the control data flow graph, wherein the node is a branch node having an input control port and an input data port and at least one output data port.

19. The computer-readable medium as recited in claim 14, wherein the instructions further cause the processor to carry out the step of computing an input control edge of the control data flow graph, wherein the node is a merge node having an input control port and an output data port and at least one input data port.

20. The computer-readable medium as recited in claim 14, wherein a construct node is the same as an operation node.

21. A logic network for performing an observability analysis at the behavioral level of a digital system, the logic network comprising:

logic objects configured to emulate behavioral observabilities computed from a control data flow graph (CDFG), wherein the logic objects include at least one of:

first logic objects configured to compute a token observable condition (TOC) of an edge of the CDFG, wherein the token observable condition is used to identify a redundant edge of the control data flow graph (CDFG); and second logic objects configured to compute a node observable condition (NOC) of a node of the CDFG, wherein the node observable condition is used to identify a redundant node of the control data flow graph (CDFG).

22. The logic network of claim 21, wherein the portion of the control data flow graph (CDFG) includes at least one of:

an output node;

an operation node;

a branch node;

a merge node;

a data edge; and a control edge.

* * * * *